United States Patent
Codenie et al.

(10) Patent No.: US 11,153,661 B2
(45) Date of Patent: Oct. 19, 2021

(54) SYSTEMS AND METHODS FOR DISTRIBUTING CONTENT

(71) Applicant: Synamedia Limited, Staines Upon Thames (GB)

(72) Inventors: Jan Codenie, Lokeren (BE); Chris Coene, Torhout (BE); Koen Van Renterghem, Lievegem (BE)

(73) Assignee: SYNAMEDIA LIMITED, Staines Upon Thames (GB)

( * ) Notice: Subject to any disclaimer, the term of this patent is extended or adjusted under 35 U.S.C. 154(b) by 0 days.

(21) Appl. No.: 16/576,715

(22) Filed: Sep. 19, 2019

(65) Prior Publication Data
US 2021/0092493 A1 Mar. 25, 2021

(51) Int. Cl.
| | |
|---|---|
| *H04N 21/00* | (2011.01) |
| *H04N 21/6379* | (2011.01) |
| *H04H 60/16* | (2008.01) |
| *H04N 21/234* | (2011.01) |
| *H04N 21/2187* | (2011.01) |
| *H04H 60/37* | (2008.01) |

(52) U.S. Cl.
CPC ........ *H04N 21/6379* (2013.01); *H04H 60/16* (2013.01); *H04H 60/372* (2013.01); *H04N 21/2187* (2013.01); *H04N 21/23418* (2013.01)

(58) Field of Classification Search
CPC ............ H04N 21/00; H04N 7/00; H04N 11/00
See application file for complete search history.

(56) References Cited

U.S. PATENT DOCUMENTS

| | | | |
|---|---|---|---|
| 2006/0062292 A1* | 3/2006 | Boice | H04N 19/14 375/240.01 |
| 2006/0282848 A1* | 12/2006 | Watanabe | H04N 21/42204 725/37 |
| 2011/0078468 A1* | 3/2011 | Ohno | G06F 1/3203 713/310 |

\* cited by examiner

*Primary Examiner* — Maryam A Nasri
(74) *Attorney, Agent, or Firm* — Finnegan, Henderson, Farabow, Garret & Dunner, LLP

(57) ABSTRACT

A processor of a broadcasting selects an encoding method for a first broadcast based on a first broadcast characteristic, wherein the encoding method is a default encoding method when the first broadcast characteristic is not recognized by the system, and transmits the first broadcast, encoded using the encoding method, to a playback device. The processor further uses a feedback control loop to dynamically adjust parameters of the encoding method to optimize a metric related to quality and a bitrate of the encoded first broadcast. The processor transmits a second broadcast encoded using the encoding method having the adjusted parameters to the playback device.

21 Claims, 12 Drawing Sheets

200

SYSTEMS AND METHODS FOR DISTRIBUTING CONTENT

TECHNICAL FIELD

The present disclosure relates to systems and methods for distributing content, and more particularly, to systems and methods for encoding content and distributing the encoded content to user devices.

BACKGROUND

Video delivery involved sending an encoded video signal over a fully managed and closed network. Typically, a fixed amount of bandwidth was reserved within the network for a video service or a group of video services to guarantee reliable video transmission to set-top boxes (STB) or television sets with built-in decoders. Examples of such networks are cable networks or direct-to-home (DTH) satellite networks. But the advent of streaming services using adaptive bitrate (ABR) technology disrupted this traditional video delivery model. Video can now be delivered over fixed and mobile data networks to a variety of devices such as smartphones, tablets, and smart television sets. Adaptive bitrate streaming is a method of video streaming over Hypertext Transfer Protocol (HTTP) where the source content is encoded at multiple bit rates, and each of the different bit rate streams is segmented into small multi-second or sub-second parts. The streaming client is made aware of the available streams at differing bit rates and segments of the streams by a manifest file. When initiating a streamed broadcasting session, the client typically requests the segments from the lowest bit rate stream. If the client finds that download speed is greater than the requested bit rate of the downloaded segment, it may request the higher bit rate segments. On the other hand, if the client finds that the download speed for a segment is lower than the requested bit rate for the segment, and, therefore, the network throughput is diminished, the client may request a lower bit rate segment. The segment size can vary depending on the particular implementation, for example, between two and ten seconds. The ABR segments are traditionally encoded with a constant bitrate (CBR). A disadvantage of CBR encoding is that video quality (VQ) of the encoded video depends on the actual video content. In this case, the encoder aims to maximize the picture quality within a bitrate budget. In various cases, when using ABR streaming, a bitrate may be too high for content that does not include significant changes between frames (e.g., a news program) and may be too low for other content that includes significant changes between frames (e.g., a broadcast program of a sporting event). In various embodiments, broadcasting may include simultaneous transmission of data to multiple recipients. For instance, in networking, broadcasting occurs when a transmitted data packet is received by all network devices. In an example embodiment, a broadcast program may be a program that is being broadcasted to multiple recipients. This means that for some content bandwidth is wasted (since the content may look equally good at a lower bitrate), while for other content, VQ may not be sufficient. One way to solve this problem is to encode the ABR profiles at a constant quality (CQ) instead of a constant bitrate. Encoding at constant quality means that the video encoder adapts the video bitrate to the actual video content that is encoded to reach a pre-configured VQ target. This also means that for the same VQ target, some content (e.g., a cartoon) will be encoded at a low bitrate, while other video content (e.g., a broadcast program of a sporting event) will be encoded at a high bitrate.

SUMMARY

Consistent with a disclosed embodiment, a broadcasting system having at least one processor executing instructions for performing operations is provided. The operations may include selecting an encoding method for a first broadcast based on a first broadcast characteristic, wherein the encoding method is a default encoding method when the first broadcast characteristic is not recognized by the system, and transmitting the first broadcast, encoded using the encoding method, to a playback device. The operations may further include using a feedback control loop to dynamically adjust parameters of the encoding method to optimize a metric related to quality and a bitrate of the encoded first broadcast, and transmitting a second broadcast encoded using the encoding method having the adjusted parameters to the playback device.

Consistent with another disclosed embodiment, a broadcasting system having at least one processor executing instructions for performing operations is provided. The operations may include receiving a first broadcast and the first broadcast related data record, and when a classification based on the data record is available, selecting the classification for the first broadcast, otherwise, selecting a default classification. The operations may further include selecting an encoding method reflecting the classification and bandwidth for a playback device, transmitting the first broadcast, encoded using the encoding method, to a playback device, and, for the encoding method, computing a metric related to a quality and a bitrate of the first broadcast. When the metric is outside a range of target metric values, the operations may include using a feedback control loop for dynamically adjusting parameters of the encoding method to place the metric within the range of the target metric values, and updating the parameters of the encoding method. The operations may further include transmitting a second broadcast encoded using the encoding method having the adjusted parameters to the playback device.

Consistent with another disclosed embodiment, a broadcasting system including a database configured to store information related to broadcasts is provided the system may include at least one processor executing instructions for performing operations. The operations may include receiving a first broadcast, receiving a first data record corresponding to the first broadcast, establishing correspondence of the first data record to at least another data record related to a previous broadcast stored in the database, when correspondence is found, retrieving parameters of an encoding method from a database, the encoding method related to the previous broadcast, and when correspondence is not found, selecting the parameters of an encoding method based on a default encoding method. The operations may further include selecting an encoding method reflecting the parameters and bandwidth for a playback device, transmitting the first broadcast, encoded using the encoding method, to a playback device, and, for the encoding method, computing a metric related to a quality and a bitrate of the first broadcast. When the metric is outside a range of target metric values, the operations may further include using a feedback control loop for dynamically adjusting parameters of the encoding method to place the metric within the range of the target metric values, and updating the parameters of the encoding method. The operations may further include transmitting a second broadcast encoded using the encoding method having the adjusted parameters to the playback device.

BRIEF DESCRIPTION OF THE DRAWINGS

The accompanying drawings are not necessarily to scale or exhaustive. Instead, the emphasis is generally placed upon illustrating the principles of the embodiments described herein. These drawings, which are incorporated in and constitute a part of this specification, illustrate several embodiments consistent with the disclosure, and, together with the detailed description, serve to explain the principles of the disclosure. In the drawings.

DETAILED DESCRIPTION

Figure 1:
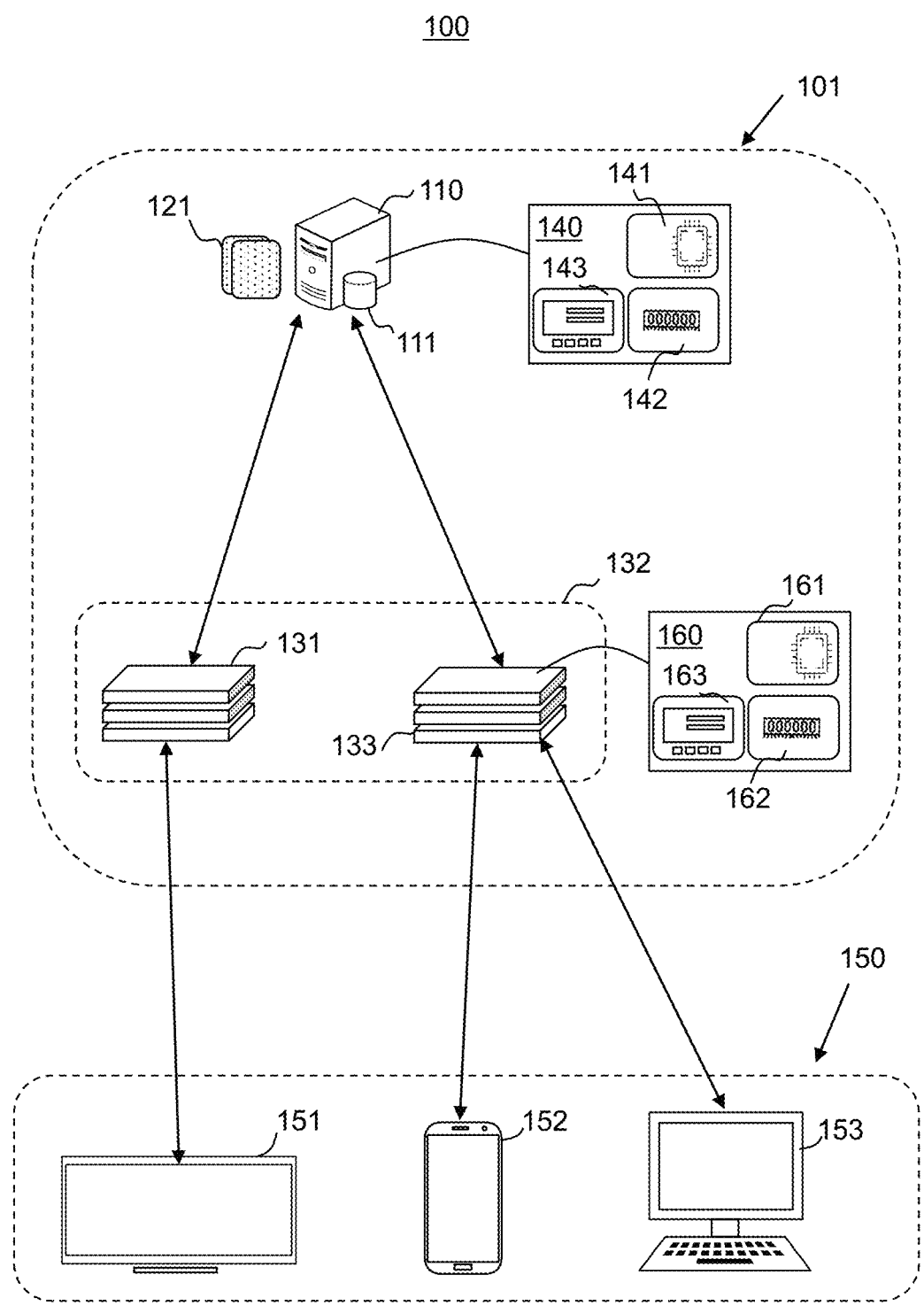
FIG. 1 is an example system for streaming and encoding content consistent with disclosed embodiments.

Reference will now be made in detail to exemplary embodiments, discussed with regard to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

The disclosed embodiments relate to broadcasting systems and methods for media streaming such as live broadcast channels (e.g., news channels, sports channels, movie channels, and the like) over a content delivery network (CDN). The broadcasting system may be broadcasting a live television program. Contrary to an on-demand service, such as Netflix, the live television broadcast does not allow for an iterative approach of optimizing encoding of the live streaming content. For example, content that is not being streamed live (e.g., a movie or an episode of a series that may be distributed by Netflix) may be encoded using multiple encoding approaches and the best encoding may be selected for streaming the content to user devices. Such an approach is not possible for live streaming. For live streaming, an alternative approach is selected based on information about the live television broadcast. The information may include recurrence information for the broadcast, the similarity of the broadcast to other live streaming programs, for which an encoding method has been selected, a statistical information about quality and a bitrate of the other streaming programs with the selected encoding, genre information of the broadcast, and the like. The present disclosure describes aspects of a system and a method for encoding a live television program for broadcasting, based on information available about the broadcast and information available about other streaming programs. One of the differences of the present approach with previously used approaches is that the proposed technique does not require heavy computations (e.g., the proposed approach may not require pre-processing of the video prior to transmission). Nor does it require any pre-characterization of the video to be encoded. It can be applied in real-time and is particularly suited for live broadcast channels resulting in significant bitrate savings. Performance of the disclosed approach may improve as the encoding system processes an increasing number of different channels.

A broadcasting system may include a database configured to store information related to broadcasts. In various embodiments, the system may include various computing devices that may have one or more processors for executing instructions to perform various broadcast-related operations. The operations may include receiving a first broadcast and receiving a data record corresponding to the first broadcast. The data record may include a title of the first broadcast, a type of the first broadcast (e.g., the type of the first broadcast may be news, sports, cartoons, and the like), a recurrence of the first broadcast (e.g., the first broadcast may air every morning), a similarity of the first broadcast with other broadcasts (e.g., the first broadcast may be of type news and be similar to other news related broadcasts), a genre of the first broadcast (e.g., if the first broadcast is a movie, the genre may be, for example, a thriller, a romantic comedy, and the like). The data record may also contain any other suitable information that can be used to determine the appropriate encoding for the first broadcast. In some cases, the data record may indicate that the first broadcast is part of a series, may contain the names of actors or participants, as well as include various parameters that define the encoding method used for the first broadcast.

In various embodiments, the operations may include establishing correspondence of the data record of the first broadcast to at least another data record related to a previous broadcast stored in the database. For example, the correspondence may be established if some information from the data record of the first broadcast is the same as information from another corresponding data record related to the previous broadcast. For instance, the correspondence may be established if the titles of the data records match, or any other suitable information match (e.g., a type, a genre, a recurrence, a similarity of the first and the previous broadcast match, and the like).

In various embodiments, when correspondence is established, the broadcasting system may retrieve from the database the parameters of an encoding method related to the previous broadcast, and use the retrieved parameters for encoding the first broadcast. When correspondence is not found, the system may select the parameters of an encoding method based on a default encoding method. Once the parameters have been determined, the broadcasting system may select the encoding method reflecting the parameters and bandwidth for a playback device. For example, if the bandwidth for the first broadcast is the same as bandwidth for the previous broadcast, the parameters may not be modified, but if the bandwidth for the first broadcast is different from the bandwidth for the previous broadcast, the encoding parameters may be adjusted. For example, if the bandwidth for the first broadcast is lower than the bandwidth for the previous broadcast, the video quality (VQ) may be lowered.

After encoding the first broadcast, the broadcasting system may transmit the first broadcast, encoded using the encoding method, to a playback device. Additionally, the system may store the first broadcast, the encoded first broadcast, and any other suitable information and parameters related to the first broadcast and its encoding for further processing. In an example embodiment, the system may compute a metric related to quality and a bitrate of the encoded first broadcast. If it is determined that the metric is outside a range of target metric values, the broadcasting system may use a feedback control loop, as further described below, for dynamically adjusting parameters of the encoding method to place the metric within the range of the target metric values. The system may then update the parameters of the encoding method; receive a second broadcast, encode the second broadcast using encoding method having updated parameters, and transmit the second broadcast to the playback device.

A broadcasting system, according to this disclosure, may include a server and a database communicatively connected to a content delivery network (CDN). For example, FIG. 1 shows an example of CDN 100 that includes a broadcasting system 101. Broadcasting system 101 may include a server 110, a set of edge computing systems 132 communicatively connected to server 110 and user devices 150. For example, FIG. 1 shows an edge computing system 131 connected to a device 151 and an edge computing system 133 connected to a device 152 and a device 153. In some instances, broadcasting system 101 may include an encoding system that may be part of edge computing systems 132. Additionally, or alternatively, broadcasting system 101 may include an encoding system that may be part of server 110. In an example embodiment, FIG. 1 shows a first encoding system 140 as a part of server 110. System 140 may include one or more processors 141, a memory 142 for storing programming instructions, and an interface 143 for modifying programming instructions and controlling various parameters of encoding system 140. Additionally, FIG. 1 shows an encoding system 160 as a part of edge computing system 133. Similar to system 140, encoding system 160 may include one or more processors 161, a memory 162 for storing programming instructions, and an interface 163 for modifying programming instructions and controlling various parameters of system 160.

In various embodiments, server 110 may include at least one database 111 for storing content, including, for example, the multimedia data, and any other relevant data related to the performance of server 110. For example, other relevant data may include profile data of various users of server 110 that can include user multimedia preferences, user authentication information, or any other user related information (e.g., links to other users, and the like). Server 110 may include at least one processor for performing various tasks, such as receiving communication data from edge computing systems 132, decrypting the communication data, for cases when the data is encrypted, analyzing the communication data (e.g., determining what type of multimedia is being requested by a user device, authenticating user devices 150, and the like), retrieving multimedia content requested by user devices 150, encrypting and/or encoding the content, and transmitting the encrypted content to one or more edge computing systems 132.

In an example embodiment, a request from a user device (e.g., device 153) may be communicated to server 110 that may include a request for content by device 153. Server 110 may retrieve a content 121 that, for example, may be a broadcast, and communicate content 121 to edge computing system 133. Edge computing system 133 may encode content 121 using system 160. In an example embodiment, system 160 may transmit the encoded content 121 to device 153.

Encoding system 160 and/or system 140 may include trainable computer-based machine learning models, such as for example, neural networks. In some embodiments, system 160 may include multiple machine learning models (e.g., multiple neural network systems) capable of interacting with one another. For example, machine-learning models may include neural networks, recurrent neural networks, convolutional neural networks, decision trees, and models based on ensemble methods, such as random forests. Additionally, or alternatively, system 160 and/or system 140 may include machine-learning models that may be configured to compete or cooperate with one another. For example, system 160 and/or system 140 may include generative adversarial network (GAN) models, and the like.

In some embodiments, at least one processor of an encoding system (e.g., system 160) may be configured to select an encoding method for content 121 based on a program characteristic related to content 121. For example, the characteristic may be a title of content 121 (e.g., a text string describing a name of a broadcast channel, a text string describing a title of an episode of a broadcast series, a movie title, and the like), a description of content 121 (e.g., a text data briefly describing a plot of a movie) a description of a genre (e.g., drama, comedy, action etc.) of content 121, a description of a type of content 121 (e.g., sports channel, news channel, a broadcast series, and the like), a list of actors participating in content 121, when content 121 is a movie, a list of broadcast programs that are similar to content 121, or any other suitable information that may be used to classify content 121 as belonging to a class of similar media.

In some embodiments, information about various broadcast programs may be stored in database 111. Such information may include various broadcast program characteristics similar to the characteristic related to content 121. For example, the information may include a title of a broadcast program, a description of the program, a genre of the program, a type of a program, or any other suitable information that may be used to classify the program. The information related to various broadcast programs may be entered into database 111 by an administrator of broadcasting system 101. Additionally, or alternatively, the information may be received from outside sources. For example, broadcasting system 101 may have access to various other databases and websites containing information about various broadcast programs. For example, system 101 may have access to the Internet movie database (e.g., IMDb database), In some embodiments, system 101 may have limited information about a broadcast program (e.g., a title of the program, an information about a lead actor, a set of video frames of the program, that may be common to various episodes of the program, and the like) and may access other information about the program from outside databases and websites. For example, system 101 may have a title of a movie and access the IMDb database to identify a genre of the movie, a description of the movie, and the like.

Additionally, database 111 may store information related to the encoding of the program. For example, if an encoding is found for the program (e.g., optimal parameters of the encoding were found for the program using any suitable approach), the information about the encoding may be stored in the database. In some cases, more than one encoding may be stored for the program; different encoding parameters may be used depending on the circumstances related to the requestor transmission medium or other program characteristics. In some cases, a first encoding may be used for a first portion of the program and a second encoding may be used for the second portion of the program. For such cases, both the first and the second encoding may be stored in database 111 for the program.

In some embodiments, at least one processor of broadcasting system 101 may be configured to create a classification for various content. In an example embodiment, a broadcast program may be classified as a recurrent or nonrecurrent. A recurrent broadcast may be classified, for example, as news, series, or classified by a type of a show (e.g., "Morning Joe," "Good Morning America," and the like). A nonrecurrent broadcast may be classified as a type of broadcast e.g., a sports event, a political event, a music performance event, and the like), In some cases, a nonrecurrent broadcast may be a movie, a video translation of a one-time event, and the like. For such cases, system 101 may be configured to find similar broadcast programs that include related encoding information stored in database 111.

For cases when the program characteristic related to content 121 is not found (e.g., when there are no broadcast programs that are similar to content 121 and have an associated encoding method) broadcasting system 101 may be configured to use a default encoding method. For example, a default encoding method may be a method that has parameters obtained by averaging parameters of other encoding methods used for various other programs. In some cases, programs with a very dissimilar encoding method than most of the other programs (also referred to as program outliers) may be removed from a sample of programs whose encoding methods are used for obtaining the default encoding method).

Figure 2:
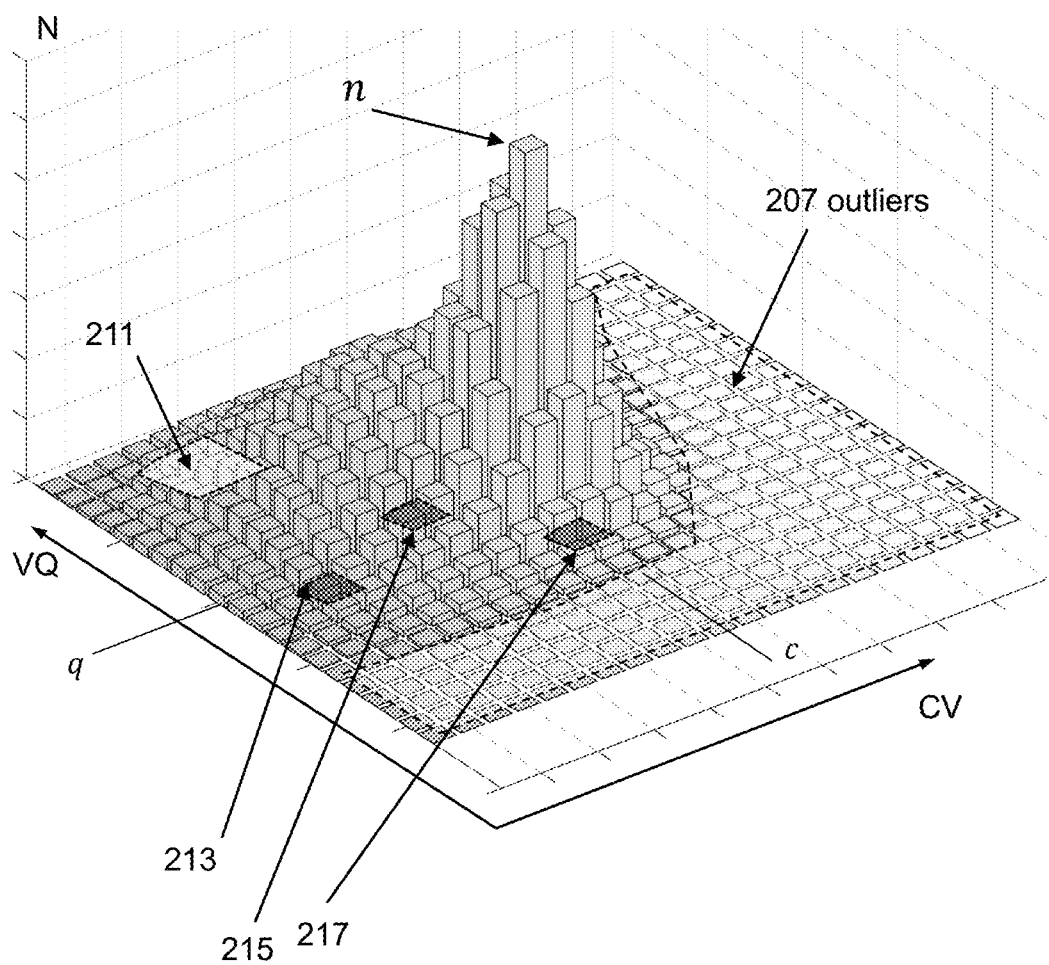
FIG. 2 is an example bar graph where a bar indicated a number of broadcast programs encoded with parameters of video quality (VQ) and a cap value (CV) consistent with disclosed embodiments.

FIG. 2 is an illustrative bar graph 200 of a number N of broadcasting programs that are encoded using an illustrative encoding method (e.g., a constant quality encoding method as described above) that may be characterized by a set of parameters (e.g., parameters VQ and CV, as shown in FIG. 2). For example, parameter VQ may be a target video quality, and parameter CV may be a target cap value (also referred to as a bitrate cap) that limits a peak bitrate of a video signal regardless of the video signal quality. A vertical bar in FIG. 2 corresponds to a number of programs that are encoded with a particular combination of parameters VQ and CV. For example, for parameters VQ=q and CV=c, as shown in FIG. 2, the number of programs encoded with such parameters may be n as indicated by a height of the vertical bar. Graph 200, as shown in FIG. 2 is only illustrative, and any other suitable distribution of programs as a function of parameters VQ, and CV is possible. In an example embodiment shown in FIG. 2, a large number of programs are encoded with parameters close to VQ=q and CV=c, thus, these parameters may be used for the default encoding method. In some embodiments, the default encoding method may be obtained by calculating parameters $\bar{q}$, and $\bar{c}$ using a "center of mass" approach. Using such an approach, a height of a vertical bar of graph 200 at an illustrative point $\{q_i, c_i\}$ may be considered as a fictitious mass. Then parameters for the default encoding method may be calculated as $\bar{q}=\Sigma_i q_i \Sigma_j N_{ij}/\Sigma_{ij} N_{ij}$, and $\bar{c}=\Sigma_j c_j \Sigma_i N_{ij}/\Sigma_{ij} N_{ij}$ consistent with the expression for the center of mass calculation of an object (e.g., graph 200) located in a two-dimensional plane. In the above formulas, i is an index of the bars, as shown in FIG. 2, along the VQ direction, j is an index of the bars along CV direction, is the height of the bar with index $\{i, j\}$, $q_i$ is a value of VQ parameter at $i^{th}$ index and $c_j$ is a value of CQ parameter at $j^{th}$ index.

FIG. 2 further shows that some of the programs (e.g., news programs corresponding to domain 211) may have similar encoding characteristics. For example, all news programs may be encoded using parameters VQ and CV and may be located within a domain 211, as shown in FIG. 2. Thus, if content 121, as shown in FIG. 1, is classified as news, encoding parameters may be calculated by computing a "center of mass" within domain 211 using expressions similar to the expressions used for describing the computation of the center of mass over a larger domain, as shown above.

In some cases, the initial classification of content 121 may not be sufficient to establish the type of encoding needed for content 121. For example, content 121 may be classified as a sports related program. However, in some embodiments, sports programs may be encoded either by parameters within a domain 213, a domain 215, or a domain 217, as shown in FIG. 2. As can be concluded from FIG. 2, parameters for domain 213, domain 215, and domain 217 may differ significantly. For example, domain 213 may be related to sports channels that include running (e.g., soccer, ultimate Frisbee, and the like), domain 215 may be related channels that include slow sports activities (e.g., golf, rock climbing, and the like), and domain 217 may be related to swimming. Thus, the additional classification may be need in order to properly determine the encoding method for content 121 (e.g., content 121 may be classified as a running sport, in order to use encoding parameters corresponding to domain 213). Thus, as indicated in the example above, in some embodiments, variance of the encoding parameters for various broadcast programs within a classification may be an important parameter in deciding if further classification of content 121 may be needed. For example, if variance of the encoding parameters within a classification is above a prescribed value, a narrower classification of content 121 may be needed.

In various embodiments, if the encoding method is determined, content 121 may be encoded by encoding system associated with server 110 and transmitted via an edge computing system (e.g., system 133) to a user device (e.g., device 153). Alternatively, server 110 may determine the encoding method and transmit information about the encoding to edge computing system 133. Edge computing system 133 can then use encoding system 160 to provide encoding for content 121. Allowing edge computing system 133 to provide the encoding of a broadcast may be beneficial in order to reduce a computational load on server 110. For example, for some cases, server 110 may be serving thousands or millions of user devices, and requiring server 110 to do encoding for each requested content may lead to delay in content transmission. Alternatively, considering that edge computing system 133 serves only a limited number of devices (e.g., one device, ten devices, hundred devices, few thousand devices, or few tens of thousands of devices) that may request the content at about the same time, edge computing system 133 may have a sufficient amount of processing power to encode content for all of the content receiving user devices 150. It should be noted that in some embodiments both systems 140 and 160 may be used concurrently. For example, some of the frames may be encoded using encoding system 140, and some of the frames may be encoded using encoding system 160.

In various embodiments, when the encoding method is not determined (e.g., when broadcasting system 101 was not able to select an encoding method for a broadcast (e.g., content 121) based on a program characteristic related to content 121, encoding system 140 and/or system 160 may use a default encoding method and may also utilize a feedback control loop to dynamically adjust parameters of the default encoding method to optimize a metric related to quality of the encoded broadcast and a bitrate of the encoded broadcast. For example, system 101 may stream media content (e.g., content 121) using a default encoding method while buffering content 121 for further analysis via the feedback control loop. In an example embodiment, edge computing system 133 may use system 160, as shown in FIG. 1, to buffer content 121 in memory 162 for further analysis. In some cases, the feedback control loop may be also used when the encoding method is determined in order to further improve the parameters of the encoding approach. For example, the feedback control loop may be used to adjust the parameters of the selected encoding method.

Figure 3:
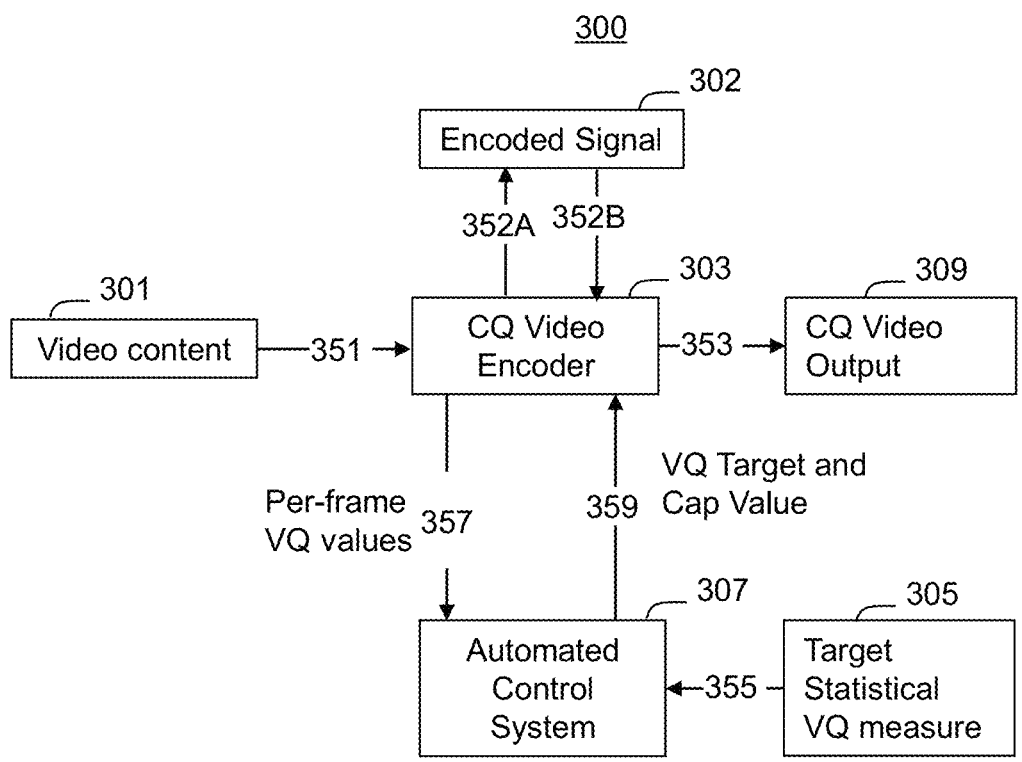
FIG. 3 is an example flow diagram of a feedback control loop system for determining encoding parameters for a broadcast consistent with disclosed embodiments.

FIG. 3 shows an example of a feedback control loop flow diagram 300. At step 351, a video content 301 (e.g., a buffered content 121) may be input in constant quality (CQ) video encoder 303 for a defined target video quality (VQ). The target video quality may be determined using any suitable methods. For example, an objective test may compute the amount of distortion of video content 301 due to encoding by finding a difference between the original content and the encoded content. A simple and common method known as the signal to noise ratio (SNR) can be a good example of objective measurement which quantifies the distortions due to the encoding by expressing it as a noise. The objective tests may vary for different digital content and may include spectral distortion (SD), root-mean-squared error (RMSE), mean squared error (MSE), peak signal-to-noise ratio (PSNR), and segmental signal-to-noise ratio (SEGSNR). It should be noted that any other suitable test may be performed for an image/video quality assessment metric (IQA) that may include determining structural similarity metric (SSIM), or a video multimethod assessment fusion (VMAF) metric, or a Stream Video Quality metric (SVQ), or the average frame QP metric, for encoded video content 301.

One of the problems with defining only a target VQ for a CQ encoder is that a bitrate of video content 301 may exhibit high peaks for challenging content (e.g., a video content that has a lot of motion, rapid scene changes, and the like). Therefore, one way to limit the peak video bitrate of the CQ encoder is by means of a target bitrate cap value (also referred to as a cap value). Thus, two configuration parameters may be employed for segments of video content 301 a value of the target VQ, and a value of the cap (also referred to as a bitrate cap). In order for CQ encoding to work properly, a well-balanced combination of these two values is needed. In case the VQ target value is chosen high, and the cap value is chosen low, the VQ target may almost never be reached (depending on the video content). Alternatively, in case the VQ target is chosen low, and the cap value is chosen high, the cap value will almost never be reached, and the VQ of the video may not be optimal.

Figure 4:
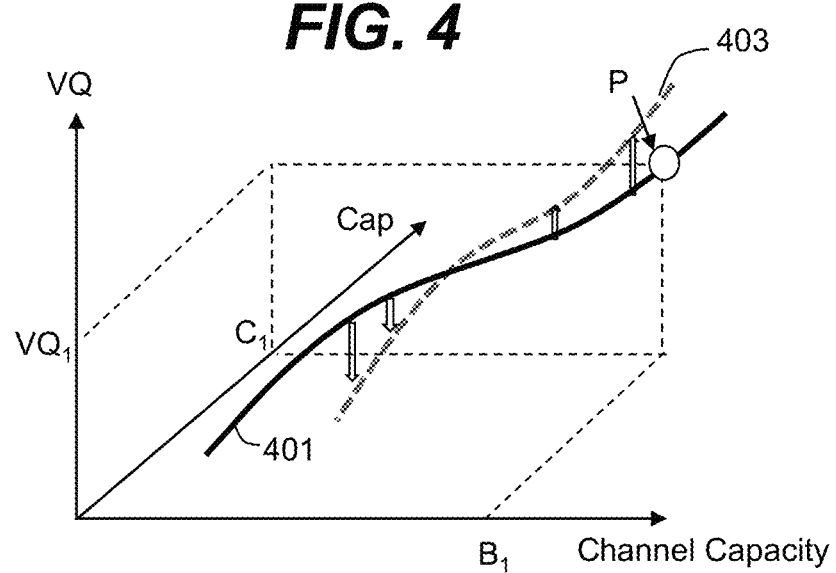
FIG. 4 is an example plot showing the dependence of video quality (VQ) and a bitrate cap value (CV) as a function of a bitrate of a broadcast consistent with disclosed embodiments.

Using the adaptive bitrate streaming approach, edge computing system 133 may prepare multiple segments of video content 301 encoded for different VQ depending on a bandwidth of the connection between system 133 and a user device (e.g., device 153 as shown in FIG. 1). FIG. 4, shows an example graph 401 that for different channel capacities (axis channel capacity) of connection between system 133 and user device 153 established a target video quality (axis VQ) and a target bitrate cap (axis Cap) of the transmitted video. For example, for the bitrate of $B_1$, a target video quality of $VQ_1$ and target bitrate cap $C_1$ may be used corresponding to point P on graph 401. In an example embodiment, by optimizing encoding approach using a feedback control method, dependence of target video quality (axis VQ) and a target cap (axis Cap) of the transmitted video may change as a function of bandwidth bitrate, as shown, for example, by a graph 403 that may be obtained by shifting graph 401 by the amount determined using a feedback control method.

Returning to FIG. 3, CQ video encoder 303 may, at step 352A, encode video content 301 using target video quality and target cap, resulting in encoded signal 302, and at step 352B analyze statistics related to encoded signal 302. For example, at step 352B, encoder 303 may analyze signal 302 and evaluate video quality of frames of signal 302. At step 357, encoder 303 may transmit statistics related the encoded video content 301 to an automated control system 307. For example, encoder 303 may provide video quality values for the encoded frames for automated control system 307. Additionally, at step 355, automated control system 307 may receive a target statistical video quality metric 305 for encoded video content 301. In an example embodiment, metric 305 may be any suitable measure that may determine the average video quality of encoded video content. In an example embodiment, target statistical video quality metric 305 may be a target conformance rate. The target conformance rate may be defined as a percentage of the frames in video content 121 that have the desired quality target. For example, the target conformance rate of 80% implies that 80% of the video frames of content 121 have a video quality value that is equal to or higher than target video quality value. It should be noted that various other metrics may be used to determine a target statistical video quality. For example, video multimethod assessment fusion (VMAF), peak signal-to-noise ratio (PSNR), structural similarity (SSIM) metrics, or Stream Video Quality (SVQ) can be used. In an example embodiment, a target average video quality metric may be used. Such metric may be computed by averaging video quality determined for each frame. Alternatively, the target median video quality metric may be used, in some embodiments, a target variance metric may include a requirement that variance in video quality of various frames is maintained at or below a target variance value. In some embodiments, a target video quality change metric may include a requirement that a change in video quality between different frames may be maintained below a target maximum change value. In some embodiments, more than one metric may be used. For example, the target conformance rate and target variance metric can be used concurrently to obtain the target conformance rate and the target variance.

In various embodiments, automated control system 307 may adjust the target VQ and the target cap value and submit the adjusted values to encoder 303 at step 359. It should be noted that any suitable feedback control technique (also referred to as a controller) can be used to adjust the target VQ and the target cap value. For example, a proportional controller, a proportional-integral controller, a proportional-integral-derivative controller, a machine-learning model (e.g., a neural network, a recurrent neural network, a convolutional neural network, a generative adversarial network, a decision tree, and models based on ensemble methods, such as random forests) may be used. The controller may have parameters that may be selected for optimizing the performance of the controller, such as parameters specific to the particular type of controller. For example, the number of features and the number of layers in a convolutional neural network may be optimized to improve the controller's performance. In some cases, parameters that affect the convergence rate for the controller may be adjusted.

The controller may be used to adjust the target VQ and the target cap value to result in target statistical video quality metric 305. Steps 357, 359, 352A and 352B may be repeated multiple times adjusting parameters such as target VQ and target cap value in order to approximately match target statistical video quality metric 305. Approximately matching may imply that statistics of encoded signal 302 may be within a few percent of metric 305. For instance, the conformance rate for signal 302 may be 82% or 78%, while target conformance rate may be 80%, thus, the conformance rate for signal 302 may be maintained within a range of target conformance rate values (e.g., between 77% and 83%).

Since the CQ encoder has parameters that can be fine-tuned, such as the target VQ and the cap bitrate, there may be two distinct approaches that can be used to control the encoding. One of the approaches may be to maintain the cap at a constant value. For such case, the automated control system 307 may adjust the target VQ value in such a way that conformance rate is at a target conformance rate (e.g., conformance rate is 80%). In some cases, the target VQ may change with time due to changes in video content. Alternatively, in another approach, the target VQ may be maintained at a constant value. For such case, the automated control system 307 may adjust the cap value in such a way that the target VQ is achieved a certain percentage of time (i.e., the conformance rate is at a predefined target conformance rate). Due to video content changes, the cap value may change over time.

In various embodiments, an update rate may be a parameter used by an edge computing system to update encoding of a broadcast that is transmitted to a user device. For example, during a feedback control process (as described for example in FIG. 3) new parameters for the encoding method may be determined for a program content (e.g., content 121) that is buffered in a memory of the edge computing system (e.g., buffered in memory 162 of encoding system 160 associated with edge computing system 133). The new parameters of the encoding method may be determined over a fixed amount of time (also referred to as update time, and is an inverse of the update rate). For example, the update time may be a few hours, ten hours, twelve hours, one day, a few days, and the like. At the end of the update time, the determined parameters may be used to update an encoding method used for encoding a broadcast for which the encoding method has been optimized.

A constant quality encoding can be used to encode various live streaming TV shows, program, TV series, and the like that may be found in an electronic program guide (EPG). As described above, programs in the EPG may be classified in groups, and for each group, an appropriate encoding method may be chosen and/or optimized. Thus, a set of encoding parameters may be derived for an entire group of similar programs instead of obtaining encoding parameters for each separate program, show, series and the like. It should be noted that while a proposed encoding approach is discussed in the context of adaptive bitrate video encoding, the same methodology can be applied to optimize the encoding parameters for constant bitrate encoding or even for statistical multiplexing.

Figure 5:
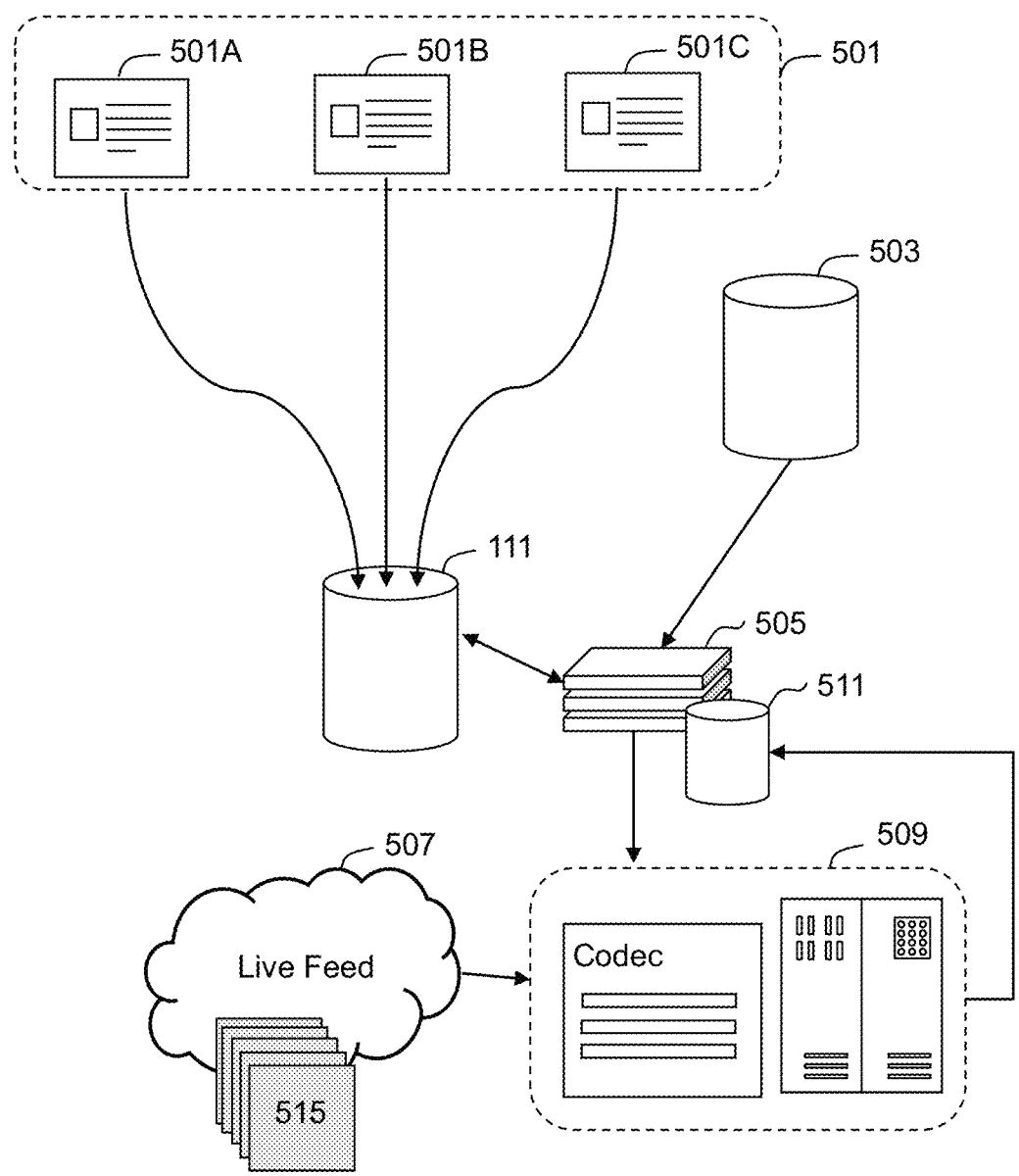
FIG. 5 is an example diagram of a system for encoding a live feed based on previously broadcasted programs consistent with disclosed embodiments.

FIG. 5 shows multiple programs 501A-501C that may be listed in an EPG. A program (e.g., program 501A) may include related information (e.g., titles of program 501A, description of program 501A, duration of program 501A, a time of the day for streaming program 501A, a channel for programs 501A, a type of program 501A, links to similar programs as program 501A, or any other suitable information for program 501A that may be used to successfully classify program 501A). FIG. 5 shows that information about programs 501 may be first stored in database 111 and then transmitted to a program classification system 505. In some embodiments, program classification system 505 may be part of system 140 or may be part of system 160. Program classification system 505 may be configured to receive information from outside sources 503 to supplement information provided by database 111. In various embodiments, program classification system 505 may be part of server 110, as shown in FIG. 1, and in some cases, program classification system 505 may be part of an edge computing system (e.g., system 133).

In an example embodiment, outside sources may include the IMDb databases of movies, or information collected from various Internet resources (e.g., Internet websites, various broadcasting services, electronic program guides for various broadcasting services, and the like). In some embodiments, broadcasting system 101 may be configured to survey encoding for various streaming video available from outside sources 503, for which video related information is available that can be used to classify the video. System 101 may then be configured to evaluate target statistical video quality metric 305 for the encoded video. For example, if the video is encoded with a constant bit rate, system 101 may be configured to evaluate a conformance rate of the video for a target video quality with a target cap value being the constant bit rate. Alternatively, if the video is encoded with a variable bit rate, the maximum bit rate may be established as the cap value, and system 101 may be configured to evaluate a conformance rate of the video for a target video quality with the target cap value being the maximum bit rate. The video related information, the cap value, the video quality, and the conformance rate for the video may be stored in database 111 using system 505. Additionally, or alternatively, some of the data may be stored in a database 511 associated with program classification system 505. Using database 511 may be advantageous when system 505 and 511 reside at the same location (e.g., at edge computing system 133). In various embodiments, database 511 may be periodically synchronized with database 111.

FIG. 5 shows an example live feed 507 (e.g., content 121), as shown in FIG. 1. In an example embodiment, live feed 507 may be input to an analytics system 509. Live feed 507 may include related information 515 that can be used to classify live feed 507 (e.g., information 515 may include a title, a description, and the like). Analytics system 509 may receive information 515 and analyze it to determine the classification of live feed 507. For example, if information 515 contains a title text string, analytics system 509 may parse the text string to determine the keywords within the text string. Additionally, or alternatively, when information 515 includes a text description of live feed 507, the text may be parsed to determine keywords that may be used for classification. In some embodiments, text may be analyzed using natural language processing to determine the classification of live feed 507.

In some cases, video frames of live feed 507 may be analyzed using any suitable image processing techniques (e.g., using machine-learning methods such as neural networks) to identify live feed 507 related information that may be used for classification of live feed 507. For instance, an image processing technique may analyze the first few frames of live feed 507 to determine a producer of live feed 507, the title of live feed 507, and the like. In some cases, the image processing technique may identify frames of live feed that are similar to frames of other shows/programs, and use information related to other shows/programs to classify the live feed. In some cases, audio of live feed 507 may be further processed by audio processing techniques (e.g., using machine-learning methods such as neural networks, signal analysis using suitable signal transforms such as a Fourier transform, and the like). The processed audio may be transcribed to determine the words within the audio. The transcribed audio may, in turn, be analyzed using natural language processing, text parsing, or any other suitable methods. In various cases, any information, e.g. closed captions, obtained from live feed 507 that may be used for classification of live feed 507 may be added to information 515.

Figure 6A:
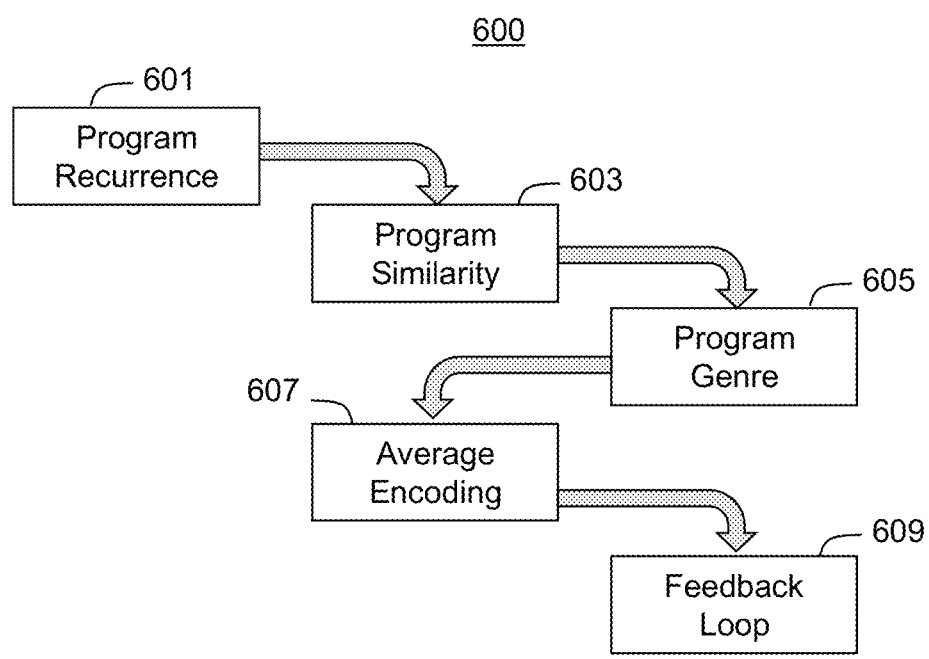
FIG. 6A is an example process of categorizing a broadcast based on broadcast characteristics consistent with disclosed embodiments.

Analytics system 509 is configured to classify live feed 507, find a related codecs based on the classification and store classified information in database 111. FIG. 6A shows an example flowchart of a process 600 that may be used to classify live feed 507. At step 601, analytics system 509 may test live feed 507 to determine if a program associated with live feed 507 is recurrent. For example, if live feed 507 is a recurrent news channel (e.g., "The Rachel Maddow Show"), live feed 507 may be classified as recurrent by system 509. For a recurrent show, the encoding method may be optimized by analytics system 509 (e.g., using a feedback process as described in relation to FIG. 3) and stored in a database (e.g., database 111 or database 511 associated with program classification system 505) corresponding to a recurrent show information (e.g., corresponding to a title of the recurrent show). Analytics system 509 may then retrieve the encoding method from a database (e.g., database 511) and encode subsequent episodes of the recurrent show using the retrieved encoding method.

In various embodiments, if a program was broadcasted before, parameters for the encoding method may be obtained based on historical data for the program. Analytics system 509 may then apply the encoding method to new episodes of the program broadcast (e.g., apply to live feed 507) and evaluate target statistical video quality metric 305 for encoded live feed 507. If metric 305 is not satisfactory, then encoding parameters may be improved via the feedback loop control as described above in connection with FIG. 3.

In some cases, live feed 507 may not be determined to be recurrent. For instance, live translation of "FIFA World Cup 2019" may not be classified as a recurrent show as it is specific to a particular sports event. In some cases, live teed 507 may not be recurrent if it is a first episode of the recurrent show, or if it is not part of the recurrent show. At step 603, analytics system 509 may determine if live feed 507 is similar to other broadcast programs. For example, live translation of "FIFA World Cup 2019" may be similar to video broadcasts related to "FIFA World Cup 2015" or translations of other world cup events. In an example embodiment, analytics system 509 may parse the title of "FIFA World Cup 2019" and determine keywords "FIFA," and "World Cup." Analytics system 509 may then compare keywords (e.g., "FIFA," and "World Cup") with words found in titles of other broadcast programs in order to find a corresponding similar program that has an associated encoding method. It should be noted that comparison of a title of live feed 507 and titles of other programs (e.g., programs 501, as shown in FIG. 5) is only illustrative, and any other suitable information may be compared. For example, system 509 may compare description information of live feed 507 with description information of programs 501 and the like.

Figure 6B:
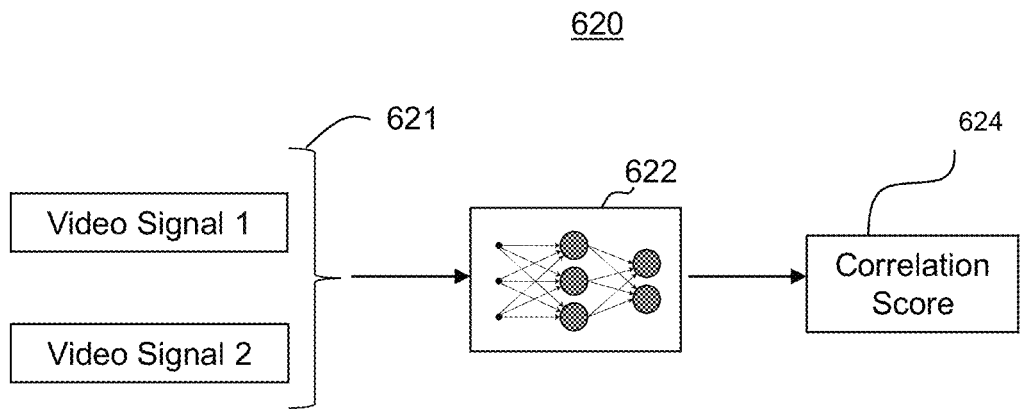
FIG. 6B is an example diagram of a machine-learning model for determining the correlation between two video signals consistent with disclosed embodiments.

In some cases, a machine-learning model (e.g., a neural network, a convolutional neural network, and the like) may be used to effectively compare two video feeds to establish an appropriate correlation. For example, FIG. 6B shows an exemplary process 620 of obtaining a correlation score 624 using a computer-based model 622. Model 622 may take as input data 621 a first video signal (video signal 1) and a second video signal (video signal 2). In various embodiments, correlation score 624 may be calculated using computer-based model 622 that may include machine-learning models, such as neural networks (e.g., convolutional neural network, decision trees, models based on ensemble methods, such as random forests, and the like). The machine-learning models may have parameters that may be selected for optimizing the performance of model 622. For example, parameters specific to a particular type of model (e.g., the number of features and the number of layers in a neural network) may be optimized to improve the model's performance. In some embodiments, correlation score 624 may range from zero to one, with zero meaning that there is no correlation between video signal 1 and video signal 2, and one meaning that video signal 1 is the same as video signal 2. It should be noted that model 622 may be designed to analyze image frames of several video signals and/or audio associated with the video signals. In various embodiments, model 622 may be trained using a data set containing pairs of video signals and related information about a correlation between the video signals in a pair of video signals.

Figure 6C:
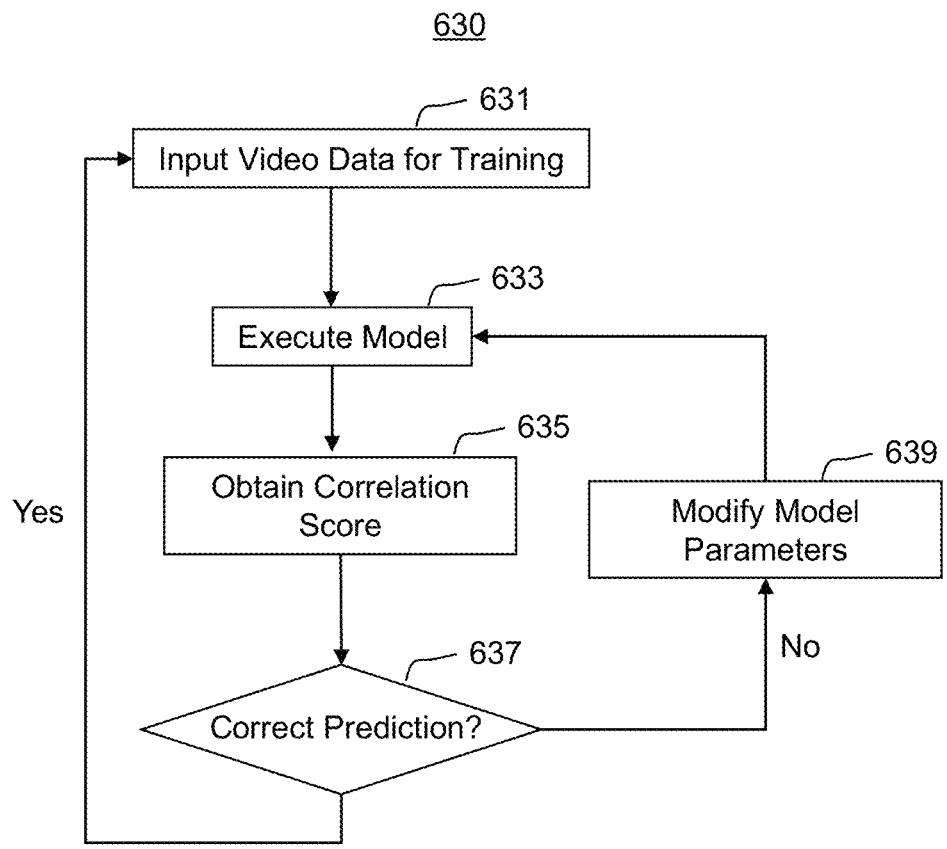
FIG. 6C is an example flowchart of a process of training a machine-learning system for comparing to video signals consistent with disclosed embodiments.

FIG. 6C shows an example embodiment of process 630 for training model 622. At step 631, training data is selected for training model 622. In various embodiments, the training data may include multiple data records, with a data record containing a pair of video signals with each pair including a target correlation score. At step 633, model 622 may perform computations, and at step 635 return predicted correlation score 624. In various embodiments, correlation score 624 may be compared with the target correlation score contained within the training data to evaluate an associated error for model 622 at step 637. If the error is below the threshold value (step 637, Yes), process 630 may proceed to step 631 of acquiring a next training data record. If the error is above the threshold value (step 637, No), process 630 may proceed to a step 639 of modifying model parameters and subsequently returning to step 633. In various embodiments, model 622 may be rated based on the average error generated by model 622. In various embodiments, model 622 may be specialized for each type of video content. For example, model 622 may be specialized for video content related to news channels, sports, movies, and the like. In various embodiments, more than one model may be used. For example, multiple computer-based models may be used to find correlations for a different type of video content. In some embodiments, a video signal (e.g., live feed 507) may be first categorized (e.g., may be categorized as a sports channel) and then compared to various sports channels using model 622 that specializes in video correlation for sports channels. Using such an approach, the sports channel that matches most closely to live feed 507 may be determined.

Figure 7:
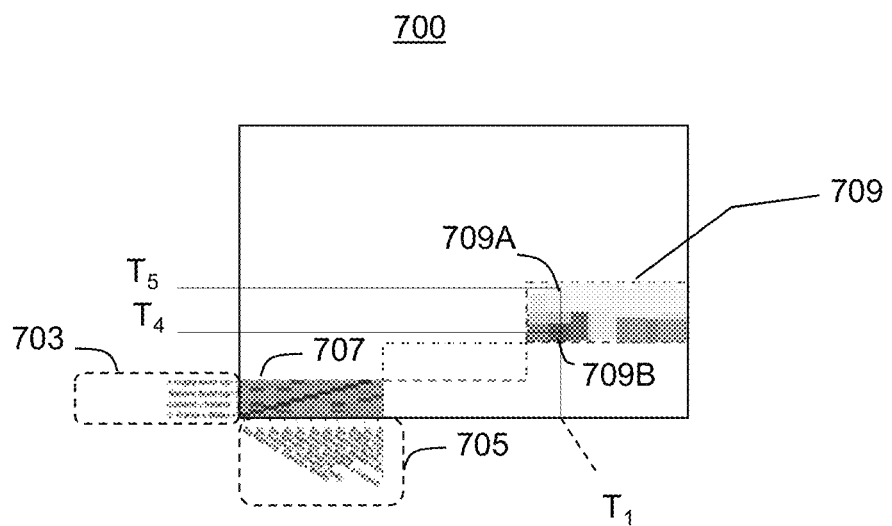
FIG. 7 is an example similarity matrix for various broadcast program titles consistent with disclosed embodiments.

In various embodiments, the similarity of live feed 507 to other broadcast programs may be determined by a machine learning algorithm, executed by system 509, that performs unsupervised clustering based on a similarity criterion of the program title. The algorithm may use a weighted sum of Jaccard and LCS (Longest common Substring) similarity to cluster programs into blocks with similar titles. The encoding parameters may be determined based on historical data of the cluster population. For example, FIG. 7 shows an example similarity matrix for an illustrative broadcast channel. The bottom cluster 707 is formed by comparing titles 705 of a first set of broadcast programs with titles 703 of a second set of broadcast programs. For example, the first set of programs may be sports events with a title "Six Nations Tournament," and the second set of broadcast programs may be various programs related to rugby. FIG. 7 shows a cluster 709 having color-coded elements (e.g., 709A and 709B) that correspond to a degree of similarity (i.e., correlation) among different broadcast programs. For example, a broadcast program $T_1$ may be similar to a broadcast program $T_4$, as indicated by a dark shade of element 709B but may be less similar to a broadcast program $T_5$, as indicated by a lighter shade of element 709A. Note that cluster 707 contains multiple color-coded elements corresponding to program titles 705 and 707.

Figure 8:
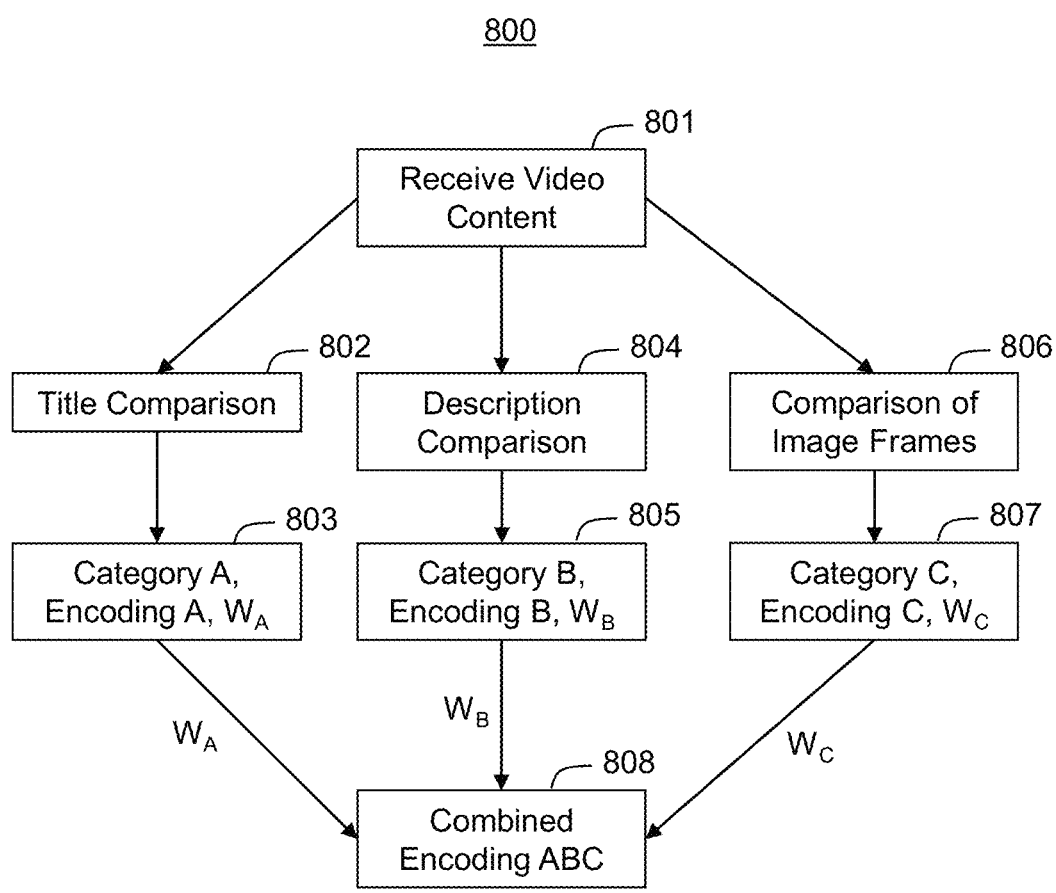
FIG. 8 is an example flowchart of a process for determining encoding parameters for video content consistent with disclosed embodiments.

FIG. 8 shows an example process 800 for determining the encoding when comparing different type of information for video content. At step 801 of process 800, video content (e.g., live feed 507) may be received by analytics system 509. At step 802, a title of live feed 507 may be compared with titles of various other broadcast programs, as described above, and based on comparison of the titles, at step 803, live feed 507 may be assigned to a particular category (e.g., category A). Category A may correspond to a particular encoding method (e.g., encoding A, characterized by a related set of encoding parameters). Furthermore, at step 803, system 509 may assign a confidence level $W_A$ that live feed 507 should be assigned to category A. In various embodiments, confidence level $W_A$ may be computed using any suitable methods of statistical analysis.

At step 804, a description of live feed 507 may be compared with descriptions of various other broadcast programs, as described above, and based on comparison of the descriptions, at step 805, live feed 507 may be assigned to a category B. Category B may correspond to an encoding B. Furthermore, at step 805, system 509 may assign a confidence level $W_B$ that live feed 507 should be assigned to category B.

At step 806, a set of image frames of live feed 507 may be compared with various other image frames of other broadcast programs. In an example embodiment, the image frames may be compared using model 622, as described above, to establish a correlation between live feed 507 and the video content of other broadcast programs. At step 807, live feed 507 may be assigned to a category C. Category C may correspond to an encoding C. Furthermore, at step 805, system 509 may assign a confidence level $W_C$ that live feed 507 should be assigned to category C.

At step 808, analytics system 509 may determine an encoding ABC as a combined encoding A, encoding B, and encoding C. For example, analytics system 509 may average target VQ values and target cap values of encoding A-C to obtain an average target VQ and an average target cap value. These average values may be used as parameters for encoding ABC. In some cases, system 509 may compute a weighted average for target VQ values and target cap values of encoding A-C, where the weights may be $W_A$-$W_C$ that are used respectively when averaging parameters of encoding A-C. Additionally, in some cases, some of the categories (e.g., category B) may be given additional weights that other categories (e.g., category A).

It should be noted that suggested steps shown in FIG. 8 are only illustrative, and other steps may be used. For example, process 800 may include a step of comparing a rating of live feed 507 with other broadcast channels, comparing a type of live feed 507 (e.g., the type being a cartoon, a movie, a live event, and the like) with types of other broadcast channels, in order to place live feed 507 in an appropriate category. For instance, by comparing ratings of live feed 507 with other channels, live feed 507 may be placed in the PG-13 category. However, this category may have a substantially smaller weight than, for example, category A, when contributing to determining encoding ABC.

Returning to FIG. 6A, when a particular content (e.g., live feed 507) cannot be classified (e.g., if live feed 507 is a nonrecurrent and dissimilar content such as a movie), at step 605, analytics system 509 may determine a genre of live feed 507. For example, live feed 507 may be a drama, an action, a comedy, a romantic comedy, a thriller, and the like. For each type of genre, analytics system 509 may determine the appropriate encoding method. At step 605, analytics system 509 may check the registration of the program title (e.g., live feed 507) in the Internet Movie Database (IMDb), or similar database. In an example embodiment, a "kind" (also referred to as type) and "genre" may be stored for each title. For instance, live feed 507 "Forrest Gump" may have attributes "kind=movie," and "genre=drama-romance." Analytics system 509 may determine genres for previously broadcasted programs and will suggest encoding parameter corresponding to the genres. In an example embodiment, action movies may have different encoding parameters than, for instance, historical documentaries.

In various embodiments, a nonrecurrent broadcast program that is not a movie (e.g., a one-time video translation of a musical event) may not be easily classified. Typically, the nonrecurrent broadcast program is a one-time broadcast event for which system 509 may not find a similar broadcast program and for which a title of the program may not be registered in the IMDb. An example of a nonrecurrent broadcast program may be a charity show such as "Comic Relief 2019." For such cases, analytics system 509 may be configured, at step 607, to select an encoding method that fits best most of the programs. For example, as shown in FIG. 2, analytics system 509 may be configured to select parameters of target VQ and target cap value (CV) corresponding to a tallest bar in FIG. 2. For example, such parameters may be around parameters VQ=q, and CV=c, as shown in FIG. 2. Alternatively, encoding may be selected based on a center of mass of graph 200 as previously discussed.

In some embodiments, a broadcast program may be broadcasted for the first time. For such a case, at step 609 of process 600, as shown in FIG. 6A, parameters of the encoding method may be optimized using the feedback control loop approach as previously discussed. The determined parameters may be stored in database 511, as shown in FIG. 5, for further use for similar broadcast programs, or broadcast programs of the same category or genre.

Figure 9:
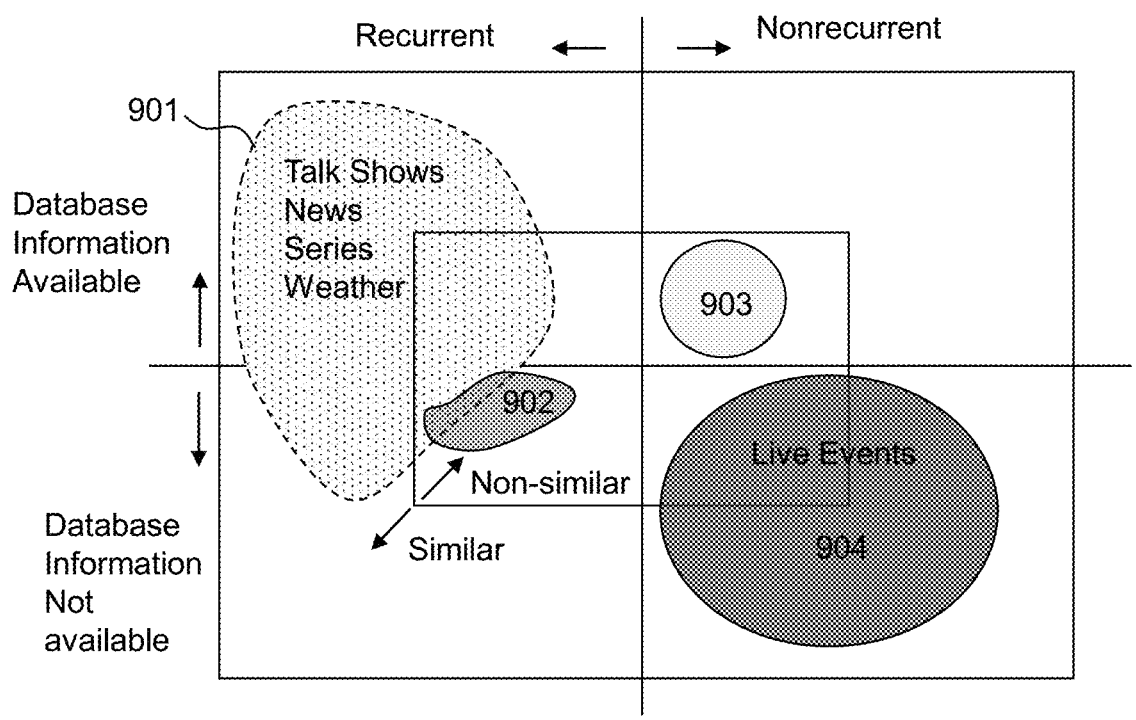
FIG. 9 is an example program reap for classifying a video content consistent with disclosed embodiments.

Analytics system 509 may be configured to establish a program map 900, as shown, for example, in FIG. 9. Program map 900 may partition all broadcast programs according to three orthogonal criteria such as recurrence, database information (e.g., IMDb registration), and title similarity with other broadcast programs, as indicated by arrows in FIG. 9. According to these criteria a broadcast program may be placed at a specific zone of map 900. For instance, zone 901 may correspond to various recurrent programs such as talk shows, news, and the like, and be located on map 900 in a region that corresponds to recurrent broadcast programs having available information (e.g., a title) and being similar to other broadcast programs. In FIG. 9, zone 902 may correspond to documentaries and live translation of sports events. Such programs may be nonrecurrent, may have no available information in a database (e.g., these programs may not be registered in Internet movie database (IMDb). Furthermore, such programs may not be similar to other broadcast programs. In FIG. 9, zone 903 may correspond to movies (e.g., programs that are registered in IMDb database but are nonrecurrent and non-similar), and zone 904 may correspond to live events (e.g., sports events, music events, and the like). As shown in FIG. 9, the broadcast programs in zone 904 may be nonrecurrent, may not have available database information, and may be similar to other programs or not.

For a broadcasting television service, an electronic program guide (EPG) includes about 60% of the programs that are recurrent. These programs may include 90-95% of all the broadcasting events in the EPG. Recurrent programs are mapped in the left side of program map 900. Nonrecurrent events, such as movies and single live (sports) events, are mapped in the right half of map 900. About 75% of the broadcast programs may be recognized in the IMDb. These programs are mapped in the upper half of the program map and may include not only movies but also recurrent TV series and shows. About 40% of various broadcast programs may be considered "similar" to other programs. In an example embodiment, similarity may be defined as similarity by the program title. Examples are "Match of the Day Live: Chelsea vs. Manchester United," "Match of the Day Live: Arsenal vs. Manchester United," or "BBC News at Ten," and "BBC News at Six." Similar programs may be mapped in the program map on the outer side of the inner square of the map, and non-similar programs may be mapped in the inner region of the inner square.

Figure 10:
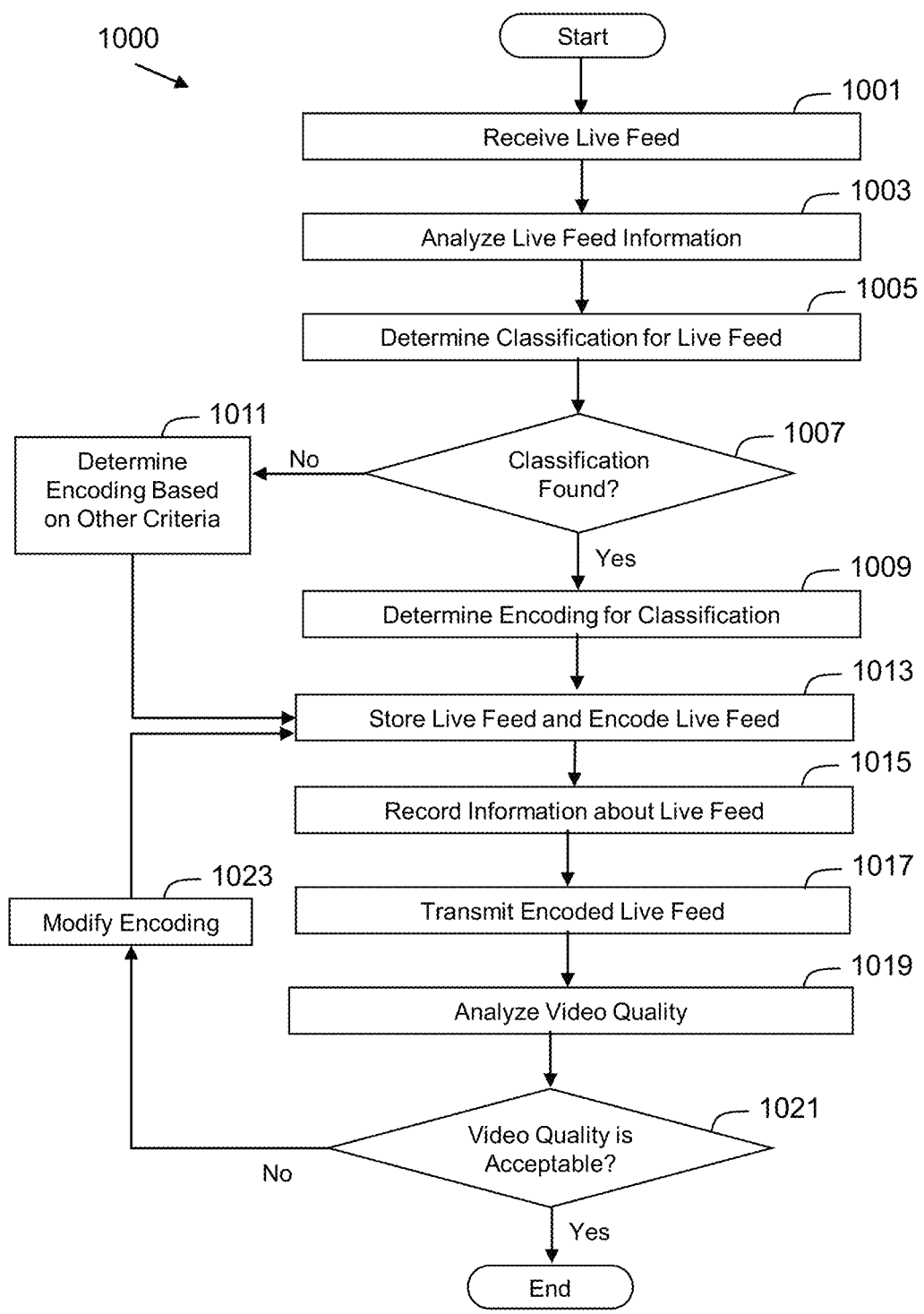
FIG. 10 is an example flowchart of a process of determining encoding parameters for video content consistent with disclosed embodiments.

FIG. 10 illustrates a process 1000 for selecting encoding parameters for the constant quality encoding of a broadcast consistent with disclosed embodiments. At step 1001, analytics system 509 may receive live feed 507, and at step 1003, system 509 may analyze information of live feed 507 (e.g., system 509 may parse a title of live feed 507 and determine keywords, as described above). At step 1005, system 509 may determine if live feed 507 may be classified.

For example, system 509 may classify live feed 507 as news, talk shows, and the like. At step 1007, system 509 may determine if classification is found in database 111 or database 511 (i.e., if database 111 or database 511 contain previously broadcasted programs that are similarly classified), If the classification is found (step 1007, Yes), system 509 may proceed to execute step 1009 at which the encoding method is determined for the found classification. In an example embodiment, system 509 may retrieve parameters of the encoding method from database 111 or database 511, as shown in FIG. 5. If, on the other hand, classification is not found (step 1007, No), system 509 may determine the encoding method based on other criteria in step 1011. Other criteria may include determining the encoding method based on the similarity of live feed 507 with other broadcast programs or determining criteria based on the genre of live feed 507. Alternatively, determining the encoding method based on other criteria may include determining the encoding method based on feedback loop control as described above. In various embodiments, parameters of the encoding method are determined either at step 1009 or step 1011, After completion of either one of these steps, at step 1013, live feed 507 may be stored for later reference and encoded. In an example embodiment, live feed 507 may be stored in database 111 or database 511. A step 1015, the information about live feed 507 (e.g., the title of live feed 507, description of live feed 507, as well as parameters for encoding live feed 507 may be recorded in database 111 or database 511). At step 1017, system 509 may be configured to transmit encoded live feed 507 to a user device. At step 1019, system 509 may analyze video quality of encoded live teed 507 and at step 1021 determine if the video quality is acceptable. For example, system 509 may use any suitable metric 305 (e.g., conformance rate) to determine if the video quality is acceptable. If the video quality is acceptable (step 1021, Yes), system 509 may complete process 1000. If video quality is not acceptable (step 1012, No), system 509 may modify encoding parameters using, for example, the feedback control loop at step 1023. The feedback control loop process may be the same as described above. After modifying encoding parameters at step 1023, process 1000 may proceed to step 1013, store the modified encoding parameters in database 111 (or database 511), and encode live feed 507 with the encoding method using the modified parameters.

Figure 11:
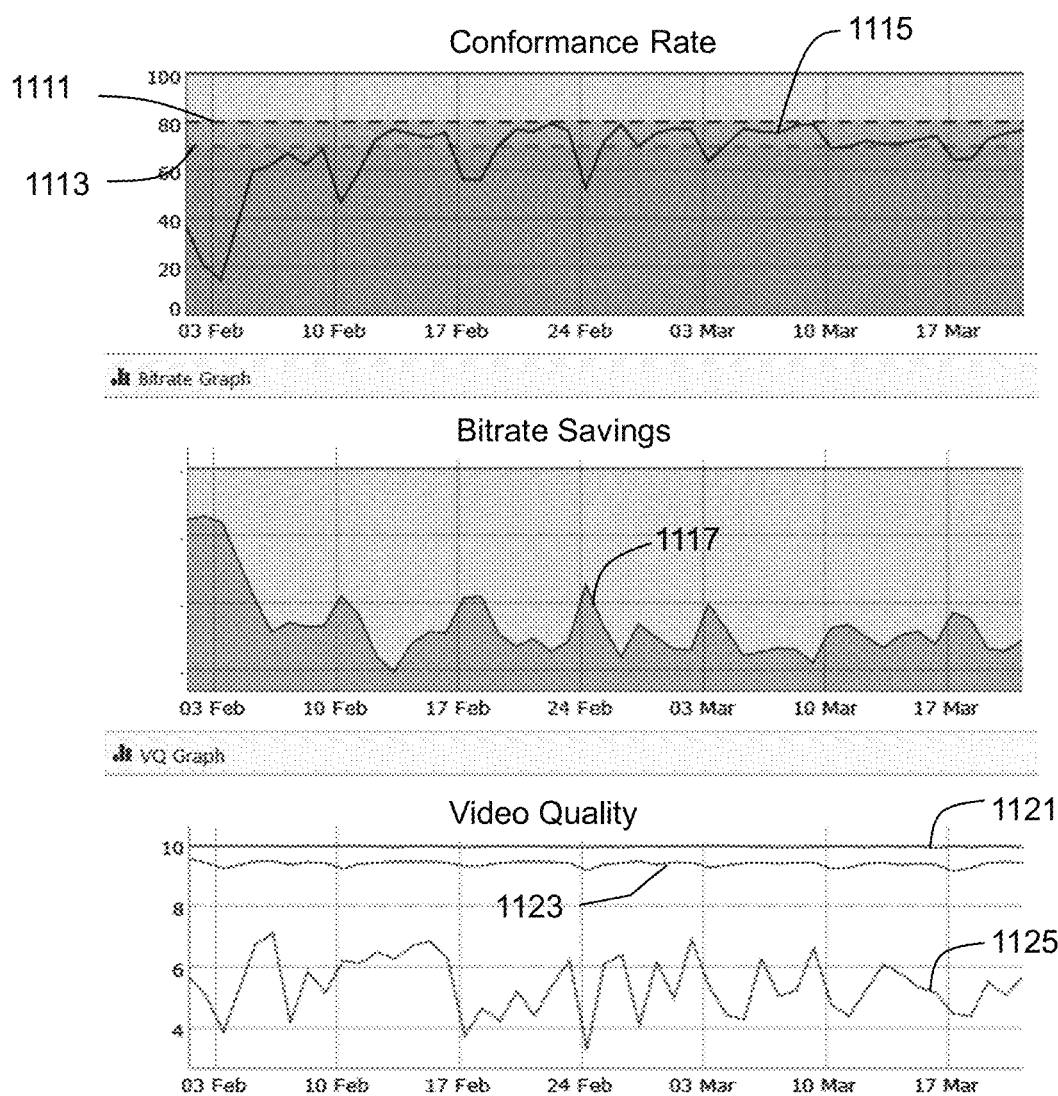
FIG. 11 show graphs of conformance rate, bitrate savings, and streaming video quality as a function of time consistent with disclosed embodiments.
Figure 12:
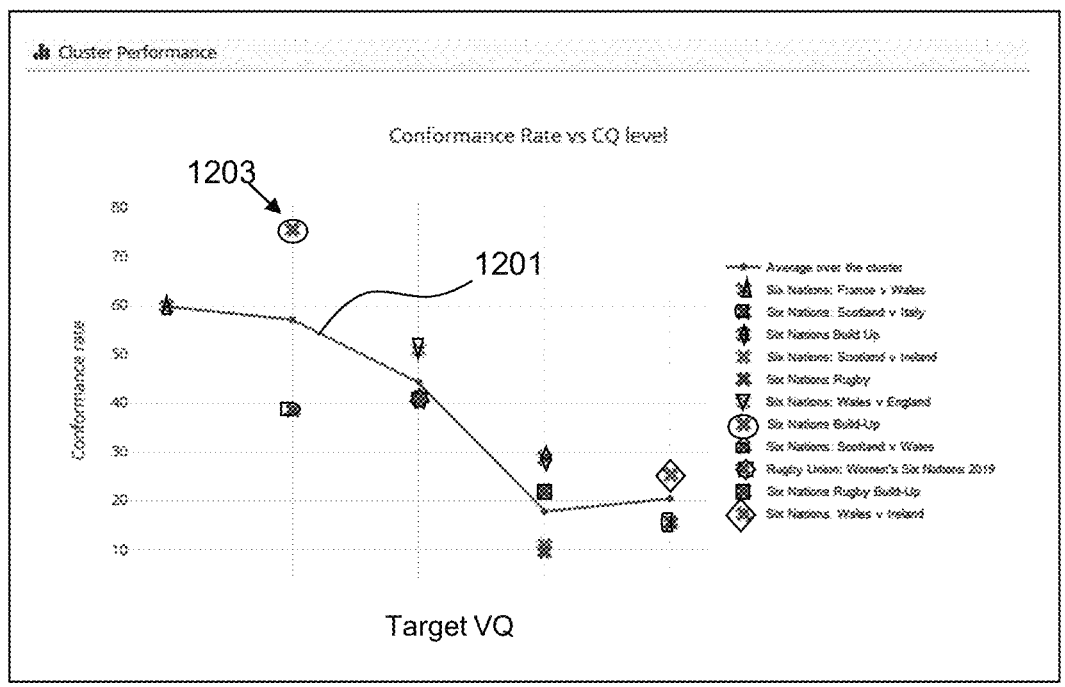
FIG. 12 is a plot of conformance rate as a function of a target video quality (VQ) consistent with disclosed embodiments.

FIGS. 11 and 12 show example results obtained using constant quality encoding for a broadcast described in this disclosure. FIG. 11, for example, illustrates a conformance rate 1115 of the broadcast as a function of time. In an example embodiment, conformance rate 1115 was outside a range defined by values 1111 and 1113 during the first part of February, as shown in FIG. 11, but was mostly inside the range during the beginning and end of March. Besides improvements in conformance rate, bitrate 1117 decrease during a time period from February to Match, as shown in FIG. 11. Further, an average video quality value 1123, and a and maximum video quality value 1121 remained mostly constant during that time period, while minimum video quality value 1125 has exhibited fluctuations during that time period. FIG. 12 shows the conformance rate as a function of the target video quality level. An example graph 1201 shows the cluster of rugby matches in the six nations cup. As more events in the cluster are discovered, the constant quality feedback control loop may adjust encoding parameters by decreasing a target VQ to yield a conformance rate of about 70% at point 1203. In various embodiments, at point 1203, bitrate savings were found to be about 30% as compared to a constant bitrate encoding scheme.

The disclosed systems and methods may be applicable to various live broadcasting services and may be adaptable to different delivery infrastructures. For example, the disclosed systems and methods can be used with multiple encoding, encryption, and packaging technologies. The disclosed methods may be employed with multiple packaging technologies such as common media application format (CMAF), MPEG-DASH, HTTP live streaming (HLS), among others. Further, the disclosed systems and methods may be independent of the streaming mode used by the client. Further, the disclosed systems and methods can operate with any version of HTTP(s) and caching protocols.

As described above, a content distribution network (e.g., network 100, as shown in FIG. 1) for broadcasting live programs may include various devices, such as processors, memory devices, and various user devices (e.g., devices 150). For example, user devices 150 may include one or more computing devices configured to perform one or more operations consistent with disclosed embodiments. For example, user devices 150 may include a desktop computer, a laptop, a server, a mobile device (e.g., tablet, smartphone, etc.), a set-top box, a gaming device, a wearable computing device, or another type of computing device. User devices 150 may include one or more processors configured to execute software instructions stored in memory, such as memory included in user devices 150 to perform operations to implement the functions related to requesting content, receiving the content and playing the content. User devices 150 may be configured for wired and/or wireless communications and may include software that when executed by a processor, performs internet-related communication (e.g., TCP/IP) and content display processes. For instance, user devices 150 may execute browser software that generates and displays interfaces including content on a display device included in, or connected to, user devices 150. User devices 150 may execute one or more applications that allow user devices 150 to communicate with components over network 100, and generate and display content in interfaces via display devices included in user devices 150. For example, user devices 150 may display a media player to output content received from edge computing system 131.

The disclosed embodiments are not limited to any particular configuration of user devices 150. For instance, a client device 150 may be a mobile device that stores and executes an application to perform operations for requesting, receiving, and playing the content. In certain embodiments, user devices 150 may be configured to execute software instructions relating to location services, such as GPS locations. For example, user devices 150 may be configured to determine a geographic location and provide location data and time stamp data corresponding to the location data to edge computing system 131.

As described above, broadcasting system 101, as shown in FIG. 1, may include server 110, a database 111, and edge computing system 131. Server 110 may include one or more computing systems that perform operations to store and provide content. Server 110 may include databases that include content, such as videos or movies. Server 110 may also include processors that perform authentication functions of user devices 150, users of user devices 150, and/or resolve client identities based on client IDs and/or a secure token. In some embodiments, server 110 may include processors configured to encode content and package content in different formats. Further, server 110 may include processing devices to resolve URLs. In some embodiments, server 110 may include multiple core processors to handle concurrently multiple operations and/or streams. For example, server 110 may include parallel processing units to concurrently handle requests of multiple user devices 150.

Database 111 may include one or more computing devices configured with appropriate software to perform operations for providing content to server 110. Database 111 may include, for example, Oracle™ database, Sybase™ database, or other relational databases or non-relational databases, such as Hadoop™ sequence files, HBase™, or Cassandra™. In an illustrative embodiment, database 111 may include computing components (e.g., database management system, database server, etc.) configured to receive and process requests for data stored in memory devices of the database and to provide data from the database.

Database 111 may be configured to collect and/or maintain the data associated with user accounts and user preferences. For example, database 111 may store information about user privileges. Database 111 may collect the data from a variety of sources, including, for instance, online resources.

Network system 100 may include any type of connections between various computing components. For example, network system 100 may facilitate the exchange of information via network connections that may include Internet connections, Local Area Network connections, near field communication (NFC), or other suitable connection(s) that enable the sending and receiving of information between the components of system 100. In some embodiments, one or more components of system 100 may communicate directly through a dedicated communication link(s).

As described, above edge computing system 131 may transmit content to user device 151. System 131 may store content in local memories, such as caching infrastructures associated with system 131, local proxies, and/or the HTTP caching capability. In some embodiments, system 131 may perform functions such as routing content, resolving domain systems, handling content requests, and creating sessions with user devices 150 for content delivery. System 131 may obtain information from other computing systems (e.g., server 110 or computing system 133, as shown in FIG. 1), arrange it for user devices 150, and deliver it to user devices 150. In such embodiments, system 131 may be configured to handle multiple streams in parallel, such as providing different data streams to multiple user devices 150. Further, system 131 may be configured to provide authentication credentials to user devices 150. For example, system 131 may provide a secure cookie, or an equivalent technique for authentication, at a session startup time.

In some embodiments, edge computing system 131 may take the form of a server, a general-purpose computer, a mainframe computer, or any combination of these components. In other embodiments, edge computing system 131 may be a virtual machine. System 131 may be configured to communicate with one or more databases, such as database 111, and other elements of system 1520 either directly or via network connections.

System 131 may include one or more storage devices configured to store instructions used by processors of system 131 to perform functions related to disclosed embodiments. For example, memory storage devices may store software instructions.

In some embodiments, processors of system 131 (e.g., processors 161, as shown in FIG. 1) may include one or more known processing devices, such as, but not limited to, microprocessors from the Pentium™ or Xeon™ family manufactured by Intel™, the Turion™ family manufactured by AMD™, or any of various processors from other manufacturers. However, in other embodiments, processors 161 may be a plurality of devices coupled and configured to perform functions consistent with the disclosure. For example, processors 161 may include a plurality of co-processors, each configured to run specific edge computing system 131 operations such as floating-point arithmetic, graphics, signal processing, string processing, cryptography or I/O interfacing. In some embodiments, processors may include a field-programmable gate array (FPGA), central processing units (CPUs), graphical processing units (GPUs), and the like.

It is to be understood that the configuration and the functionality of components of network system 100 have been defined herein for the convenience of the description. Alternative configurations can be defined as long as the specified functions and relationships thereof are appropriately performed. Alternatives (including equivalents, extensions, variations, deviations, etc., of those described herein) will be apparent. Such alternatives fall within the scope and spirit of the disclosed embodiments.

The foregoing description has been presented for purposes of illustration. It is not exhaustive and is not limited to precise forms or embodiments disclosed. Modifications and adaptations of the embodiments will be apparent from a consideration of the specification and practice of the disclosed embodiments. For example, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application; such examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents which may be resorted to fall within the scope of the disclosure.

Other embodiments will be apparent from a consideration of the specification and practice of the embodiments disclosed herein. It is intended that the specification and examples be considered as an example only, with a true scope and spirit of the disclosed embodiments being indicated by the following claims.

What is claimed is:

1. A broadcasting system having at least one processor executing instructions for performing operations comprising:
   receiving a first broadcast and a first broadcast related data record;
   when a classification based on the data record is available, determining the classification for the first broadcast;
   selecting an encoding method reflecting the classification;
   transmitting the first broadcast, encoded using the encoding method, to a playback device;
   using a feedback control loop to dynamically adjust parameters of the encoding method to optimize a metric related to quality and a bitrate of the encoded first broadcast; and
   transmitting a second broadcast encoded using the encoding method having the adjusted parameters to the playback device.

2. The system of claim 1, wherein the data record comprises at least one of a title, a recurrence, a similarity, or a genre of the first broadcast.

3. The system of claim 1, wherein optimizing the metric includes maintaining a conformance rate within a range of target conformance values, wherein the conformance rate indicates a number of frames in video content of the first broadcast having a video quality value that is equal to or greater than a target video quality value.

4. The system of claim 3, wherein the encoding includes a constant quality encoding for a target video quality using a target bitrate cap, wherein the target bitrate cap is configured to limit a peak bitrate of a video signal.

5. The system of claim 1, wherein selecting an encoding method comprises:
   categorizing the first broadcast; and
   selecting parameters of the encoding method based on a category of the first broadcast, wherein the category is one of a news broadcast, a sports broadcast, or a movie broadcast.

6. The system of claim 1, wherein a section of the first broadcast, including a plurality of frames, is used for the feedback control loop.

7. The system of claim 6, wherein the feedback control loop includes operations comprising:
   encoding the frames using a constant quality encoding for a target video quality using a target bitrate cap, wherein the target bitrate cap is configured to limit a peak bitrate of a video signal;
   determining a conformance rate of the encoded frames, wherein the conformance rate indicates a number of frames in video content of the first broadcast having a video quality value that is equal to or higher than a target video quality value;
   when the conformance rate is outside a range of target conformance values, adjusting at least one of the target video quality or the target bitrate cap; and
   re-encoding the frames using the constant quality encoding for the target video quality using the target bitrate cap.

8. The system of claim 7, wherein the adjusting at least one of the target video quality or the target bitrate cap comprises:
   receiving by a controller the frames and the conformance rate; and
   returning, by the controller, the target video quality and the target bitrate cap.

9. The system of claim 1, wherein feedback control is used when a conformance rate is outside a range of target conformance values.

10. The system of claim 1, wherein the parameters are based on a default encoding method and are computed by averaging parameter values of encoding methods of various other broadcasts, for which the parameter values are available.

11. The system of claim 1, wherein the operations further comprise:
establishing correspondence of the first data record to at least another data record related to a previous broadcast stored in a database; and
when the correspondence is found, retrieving the parameters of the encoding method from the database, the encoding method being related to the previous broadcast.

12. A broadcasting system having at least one processor executing instructions for performing operations comprising:
receiving a first broadcast and a first broadcast related data record;
when a classification based on the data record is available, determining the classification for the first broadcast, wherein determining the classification comprises determining whether the first broadcast is a recurrent broadcast or nonrecurrent broadcast;
selecting an encoding method reflecting the classification and bandwidth for a playback device;
transmitting the first broadcast, encoded using the encoding method, to the playback device;
for the encoding method, computing a metric related to a quality and a bitrate of the first broadcast;
when the metric is outside a range of target metric values:
using a feedback control loop for dynamically adjusting parameters of the encoding method to place the metric within the range of the target metric values; and
updating the parameters of the encoding method; and
transmitting a second broadcast encoded using the encoding method having the adjusted parameters to the playback device.

13. The system of claim 12, wherein the data record comprises at least one of a title, a recurrence, a similarity, or a genre of the first broadcast.

14. The system of claim 12, wherein selecting an encoding method comprises:
categorizing the first broadcast, wherein a category of the first broadcast comprises one of a movie broadcast, a news broadcast, a talk show broadcast, a sports broadcast, or a musical event broadcast; and
selecting parameters of the encoding method based on the category of the first broadcast.

15. The system of claim 12, wherein the encoding includes a constant quality encoding for a target video quality using a target bitrate cap.

16. The system of claim 15, wherein the operations further comprise adjusting at least one of the target video quality or the target bitrate cap by:
receiving, by a controller, frames of the first broadcast and a conformance rate; and
returning, by the controller, the target video quality and the target bitrate cap.

17. The system of claim 12, wherein the operations further comprise optimizing the metric by maintaining a conformance rate within a range of target conformance values, wherein the conformance rate indicates a number of frames in video content of the first broadcast having a video quality value that is equal to or greater than a target video quality value.

18. The system of claim 12, wherein a section of the first broadcast, including a plurality of frames, is used for the feedback control loop.

19. The system of claim 12, wherein feedback control is used when a conformance rate is outside a range of target conformance values.

20. The system of claim 12, wherein the parameters are based on a default encoding method and are computed by averaging parameter values of encoding methods of various other broadcasts, for which the parameter values are available.

21. The system of claim 12, wherein the operations further comprise:
establishing correspondence of the first data record to at least another data record related to a previous broadcast stored in a database; and
when the correspondence is found, retrieving the parameters of the encoding method from the database, the encoding method being related to the previous broadcast.

* * * * *